United States Patent
Stevens

(10) Patent No.: US 9,672,521 B1
(45) Date of Patent: Jun. 6, 2017

(54) REFORMATTING LEGACY SYSTEM WORK ORDERS WITH HIGHLIGHTED PROCESS COMPLIANCE

(71) Applicant: The Boeing Company, Chicago, IL (US)

(72) Inventor: Andrew P. Stevens, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 927 days.

(21) Appl. No.: 13/708,920

(22) Filed: Dec. 7, 2012

(51) Int. Cl.
| | | |
|---|---|---|
| *H04W 4/18* | (2009.01) | |
| *G06Q 30/00* | (2012.01) | |
| *G06F 17/22* | (2006.01) | |
| *G06Q 10/06* | (2012.01) | |
| *G06F 3/00* | (2006.01) | |
| *G06F 5/00* | (2006.01) | |
| *G06F 11/07* | (2006.01) | |
| *G06F 17/30* | (2006.01) | |
| *G06Q 10/10* | (2012.01) | |
| *G06F 17/40* | (2006.01) | |
| *G06F 17/20* | (2006.01) | |

(52) U.S. Cl.
CPC .............. *G06Q 30/018* (2013.01); *G06F 3/00* (2013.01); *G06F 5/00* (2013.01); *G06F 11/0727* (2013.01); *G06F 17/2235* (2013.01); *G06Q 10/06311* (2013.01); *G06F 17/20* (2013.01); *G06F 17/2247* (2013.01); *G06F 17/30* (2013.01); *G06F 17/30011* (2013.01); *G06F 17/40* (2013.01); *G06Q 10/06* (2013.01); *G06Q 10/10* (2013.01)

(58) Field of Classification Search
CPC G06F 17/30011; G06F 17/2247; G06Q 10/10
USPC ......................................................... 715/200
See application file for complete search history.

(56) References Cited

U.S. PATENT DOCUMENTS

| | | | |
|---|---|---|---|
| 5,594,639 A | 1/1997 | Atsumi | |
| 5,857,201 A * | 1/1999 | Wright et al. | |
| 6,343,324 B1 * | 1/2002 | Hubis | G06F 3/0622 709/229 |
| 6,463,352 B1 | 10/2002 | Tadokoro et al. | |
| 6,768,994 B1 * | 7/2004 | Howard et al. | |
| 6,810,429 B1 * | 10/2004 | Walsh et al. | ................. 709/246 |
| 6,959,239 B2 | 10/2005 | Williams | |
| 7,167,786 B2 * | 1/2007 | Sinex | ........................ 701/29.4 |
| 7,299,216 B1 * | 11/2007 | Liang | ................ G06F 11/0727 |
| 7,440,967 B2 * | 10/2008 | Chidlovskii | |

(Continued)

OTHER PUBLICATIONS

Chris Stary, "TADEUS: Seamless Development of Task-Based and User-Oriented Interfaces," IEEE Transactions on Systems, Man, and Cybernetics—Part A: Systems and Humans, vol. 30, No. 5, Sep. 2000, pp. 509-525.

*Primary Examiner* — Cesar Paula
*Assistant Examiner* — Luu-Phuong Nguyen
(74) *Attorney, Agent, or Firm* — Miller, Matthias & Hull LLP

(57) ABSTRACT

A data system comprises a legacy system for storing work orders and process data; and a computer-based interface module for retrieving the work orders from the legacy system, reformatting the retrieved work orders to highlight words corresponding to process compliance and insert hyperlinks to process data referenced by the work orders, and presenting the reformatted work orders with the highlighted words and the hyperlinks.

20 Claims, 4 Drawing Sheets

(56) References Cited

U.S. PATENT DOCUMENTS

2002/0019778 A1* 2/2002 Isaacson et al. ................ 705/26
2002/0069210 A1   6/2002 Navani et al.
2003/0193521 A1* 10/2003 Chen et al. ................... 345/762
2005/0026129 A1*  2/2005 Rogers ..................... G09B 7/00
                                                        434/322
2005/0240493 A1* 10/2005 Johnson et al. ............... 705/27

* cited by examiner

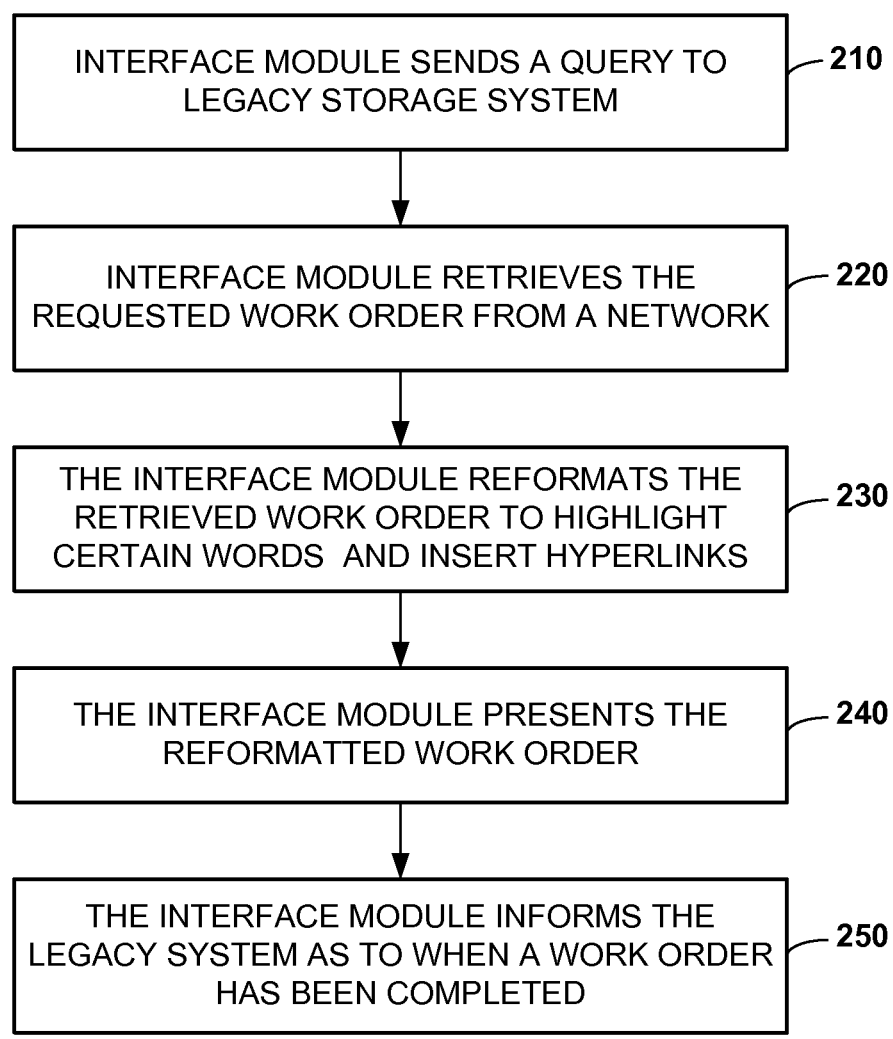

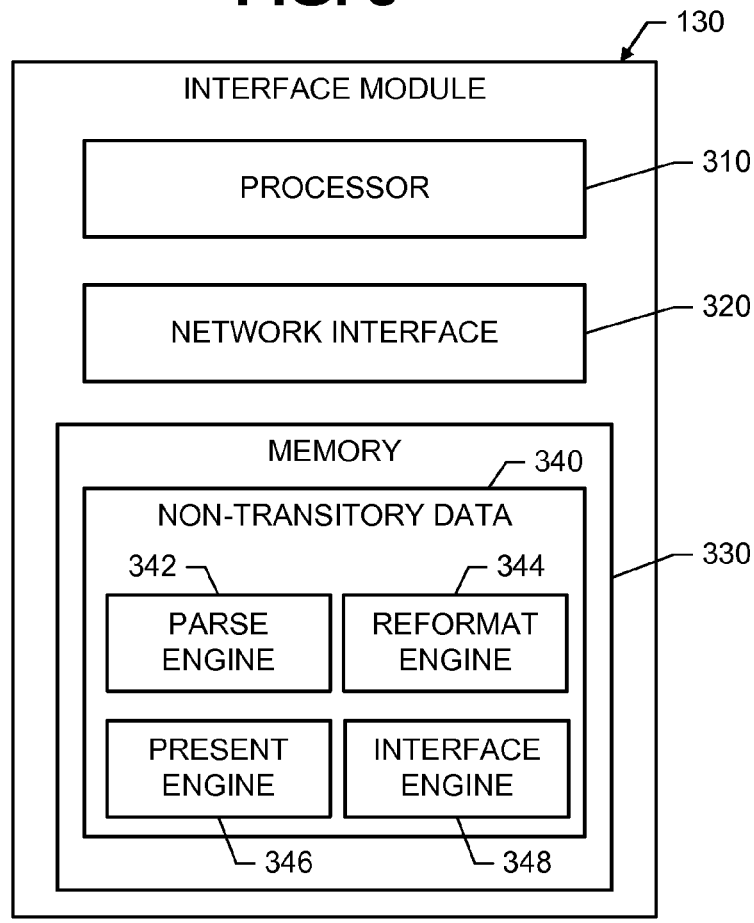
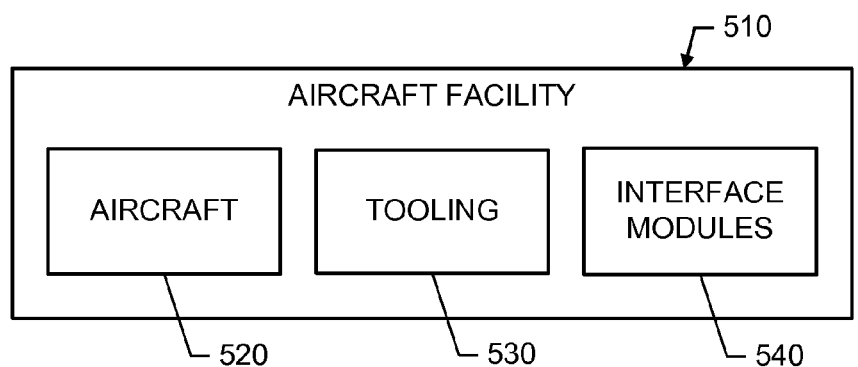

FIG. 4

```
                          WORK ORDER                    420

Date       ID              Title
    ┌────────┬────────┬──────────────────────────────┐
    │        │        │                              │
    └────────┴────────┴──────────────────────────────┘

Task    Step      Narrative                     Completed 0001     1     Install Part 1 per drawing DWG0001     No 0002     1     Install Part 2 per drawing DWG0012     No Use Process PROC0001 to install Apply shop acceptance A1 to install CAUTION:  HAZARDOUS ACTIVITY
                             AIRCRAFT CONFINED SPACE (ACCS)
```

REFORMATTING LEGACY SYSTEM WORK ORDERS WITH HIGHLIGHTED PROCESS COMPLIANCE

BACKGROUND

Installation plans describe tasks that are used for the production of large commercial aircraft. They also provide instructions for performing the tasks, and they identify production data for carrying out the tasks. The production data includes drawings, specifications and standards, canned notes, certification requirements, and business policies, procedures and processes. Installation plans are used by a variety of parties, including inspectors, mechanics, planners, engineers, machinists, auditors and anyone else involved in carrying out the production tasks.

The installation plans and production data are typically stored in database systems, which allow remote access by these parties. However, older database systems don't always provide the installation plans and production data in a user-friendly format. An older system might be developed in an antiquated programming language with an unfriendly and poorly designed user interface. Consequently, accessing the installation plans and production data from an older database system and navigating back and forth between numerous applications and files can be quite cumbersome and time consuming.

SUMMARY

According to an embodiment herein, a data system comprises a legacy system for storing work orders and process data; and a computer-based interface module for retrieving the work orders from the legacy system, and reformatting the retrieved work orders to highlight words corresponding to process compliance and insert hyperlinks to process data referenced by the work orders. The interface module also presents the reformatted work orders with the highlighted words and the hyperlinks.

According to another embodiment herein, a method of using work orders and process data stored in a legacy storage system comprises using a computer to retrieve the work orders from the legacy system, and reformat the retrieved work orders to highlight words corresponding to process compliance and insert hyperlinks to process data referenced by the work orders. The method further comprises using the computer to present the reformatted work orders with the highlighted words and the hyperlinks.

According to another embodiment herein, an article comprises computer memory encoded with non-transitory data for instructing a processor to retrieve work orders from a legacy database system; reformat the retrieved work orders to highlight words corresponding to process compliance and insert hyperlinks to process data stored in the legacy system and referenced by the work orders; and present the reformatted work orders with the highlighted words and the hyperlinks.

These features and functions may be achieved independently in various embodiments or may be combined in other embodiments. Further details of the embodiments can be seen with reference to the following description and drawings.

BRIEF DESCRIPTION OF THE DRAWINGS

FIG. 2 is an illustration of a method of using the data system.

FIG. 3 is an illustration of an example of an interface module, which forms a part of the data system of FIG. 1A.

FIG. 4 is an illustration of a reformatted work order displayed by the interface module.

FIG. 5 is an illustration of an aircraft facility that includes a plurality of interface modules.

DETAILED DESCRIPTION

Figure 1A:
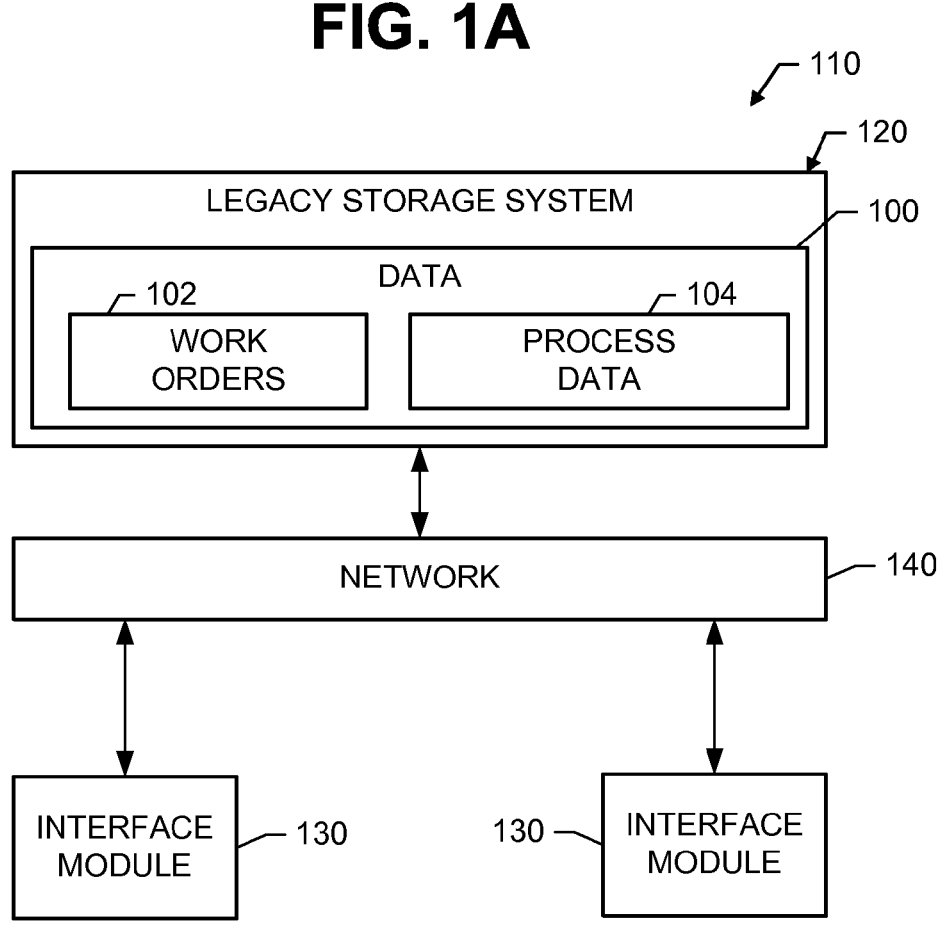
FIG. 1A is an illustration of a data system for storing, accessing and presenting work orders and process data.

Reference is made to FIG. 1A, which illustrates a data system 110 for storing, accessing and presenting data 100 related to the production of a product. The production may include at least one of fabrication, assembly, inspection, maintenance, repair, modification, reconfiguration, and refurbishment. End users of the data system may include, without limitation, inspectors, mechanics, planners, engineers, machinists, auditors and anyone else involved in carrying out production tasks.

The data system 110 is not limited to any particular product. However, the data system 110 is especially useful for a complex product having many parts, assemblies, and requirements. One such product is a commercial aircraft.

For purposes herein, the data 100 is characterized in terms of work orders 102 and process data 104. The work orders 102 specify tasks to be performed (e.g., fabrication of a part, inspection of an assembly), and instructions on how to perform the tasks. The work orders 102 also identify the process data 104 needed to perform the tasks. Examples of the process data 104 include, but are not limited to drawings, specifications and standards, canned notes, certification requirements, and business policies, procedures and processes. Canned notes refer to standard text notes containing pre-defined text for production.

The data system 110 includes a legacy storage system 120 for storing the data 100. The legacy system 120 may provide a main repository for data storage. System administration may ensure that the data 100 stored in the legacy system 120 is accurate and up-to-date.

Figure 1B:
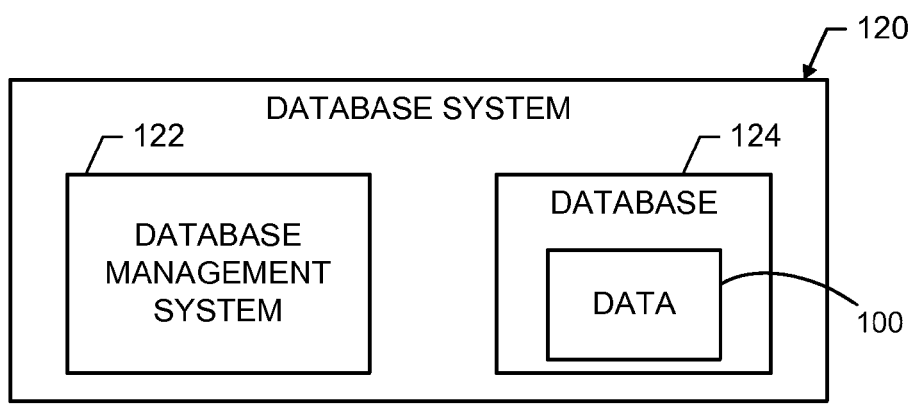
FIG. 1B is an illustration of an example of a legacy storage system, which forms a part of the data system of FIG. 1A.

Additional reference is made to FIG. 1B, which illustrates an example of a legacy storage system 120. The legacy system 120 may include a database system, which typically includes a database management system 122 and a database 124. The database 124 includes the data 100 and also supporting data structures. The database management system 122 includes a variety of components, including a database engine, a storage engine, and external interfaces. The external interfaces may include user interfaces and application programming interfaces. The database system may have a client-server architecture that enables multiple users to have remote access to the work orders 102 and the process data 104.

The legacy storage system 120 uploads certain data 100 in response to user queries. A user query identifies a specific work order 102 and/or specific process data 104. However, the legacy system 102 does not produce the requested data in a desired format. For instance, the legacy system 120 does not provide hyperlinks to process data 104, and it does not highlight any information in the work order.

Upgrading the legacy system 120 to provide the requested data in the desired format may not be an option in certain environments. The data system 110 of FIG. 1 provides a workaround that doesn't involve modifying the legacy system 120 or any data 100 stored in the legacy system 120.

The data system 110 further includes at least one interface module 130 that sends user queries to the legacy system 120, downloads requested work orders, reformats the downloaded work orders, and presents the reformatted work orders in the desired format. Each interface module 130 communicates with the legacy storage system 120 via a network 140. Communications may be based on TCP/IP, which is the communication protocol for the Internet.

Additional reference is made to FIG. 2, which illustrates a method in which the interface module 130 communicates with the legacy system 120. At block 210, the interface module 130 sends a user query to the legacy system 120. The query contains a request to retrieve a work order.

The legacy system 120 processes the request, and uploads an electronic file containing the requested work order on the network 140. The uploaded file does not contain any hyperlinking to documents referenced in the work order, nor does it contain highlighting of data.

At block 220, the interface module 130 retrieves (e.g., downloads) the requested work order from the network 140. At block 230, the interface module 130 reformats the retrieved work order to highlight words corresponding to process compliance and insert hyperlinks to process data referenced by the work orders. The highlighting, which is performed to increase noticeability of the words, may be performed in various ways including, without limitation, color coding and using bold font.

The interface module 130 may highlight words that ensure production conformance and safety compliance. The phrase "words corresponding to process compliance" refers to words that ensure conformance or safety compliance during performance of the retrieved work order. For instance, the interface module 130 may highlight certain key words, such as Cautions
Warnings
Notes
Engineering Drawings
Specifications
Processes
Policies
Procedures
Certification Requirements Words that follow these key words may also be highlighted. In this manner, the interface module 130 provides safety controls that remind and notify an end user of some particular way in which to handle or perform a production task.

The interface module may also highlight words in hyperlinks according to importance. Certain files in the process data 104 might be more important than others. For example, files labeled as engineering drawings might have a higher order of importance than files labeled as specifications, which might have a higher order of importance than files labeled as documents.

At block 240, the interface module 130 presents the reformatted work order with the highlighted words and the hyperlinks. For example, the interface module 130 may display the reformatted work order on a video monitor, print out the reformatted work order on print medium, etc.

At block 250, the interface module 130 may inform the legacy system 120 as to when a work order has been performed and completed. For example, the interface module 130 may issue a certification of completion, which the legacy system 110 may store.

The interface module 130 downloads, reformats and presents the work orders in real time. Moreover, the interface module 130 reformats the work orders without modifying the underlying data stored in the legacy system 120.

Additional reference is now made to FIG. 3, which illustrates an example of an interface module 130. The interface module 130 of FIG. 3 includes a digital processor 310, a network interface 320, and machine-readable memory 330. The memory 330 stores non-transitory data 340 that, when executed, causes the processor 310 to communicate with the legacy system 120 over the network 140 to retrieve a work order, reformat the retrieved work order, and present the reformatted work order.

To perform the reformatting, the non-transitory data 340 may include a parse engine 342 for parsing text in the retrieved work order. The parse engine 342 may analyze a string of symbols, either in natural language or in computer languages, according to the rules of a formal grammar. The analysis may include comparing the parsed symbols to a list of key words and codes. The non-transitory data 340 may further include a reformat engine 344, which highlights certain key words and codes, and inserts hyperlinks to process data identified by other key words and codes.

To present the reformatted work order, the non-transitory data 340 may include a presentation engine 346. The presentation engine 346 may include print drivers, video drivers, etc.

To receive inputs (e.g., work order identifiers) from users and communicate with the legacy system 120, the non-transitory data 340 may also include an interface engine 348. The interface engine 348 may include a graphical user interface (GUI).

The interface module 130 is not limited to any particular type of computer. Examples include, but are not limited to, desktop and mobile computers. The non-transitory data 340 may be part of a standalone program, a plug-in for a web browser, etc.

Reference is now made to FIG. 4, which provides a simple illustration of a reformatted work order 420 that is displayed via a GUI 410 by the interface module 130. The reformatted work order 420 includes columns for task, step, and narrative. Two tasks are shown (0001 and 0002), each with a single step. Both tasks make reference to drawings (DWG0001 and DWG0002), which are hyperlinked. The second task also makes reference to a process (PR000001), and a shop acceptance (A1), both of which are hyperlinked. The second task also includes a caution, which is highlighted in bold capital letters.

The reformatted work order 420 also includes a column for status of each step. FIG. 4 shows that neither step has been completed.

Reference is now made to FIG. 5, which illustrates an aircraft facility 510 for performing tasks on a commercial aircraft 520. For a facility 510 such as a factory, tasks such as component and subassembly manufacturing and system integration of the aircraft 520 will be performed during production, and inspection and certification of a completed aircraft 520 will be performed post-production. For a facility 510 such as a depot, tasks may include maintenance, repair, modification, reconfiguration, and refurbishment. The aircraft facility 510 includes appropriate tooling 530 for performing these tasks. The aircraft facility 510 further includes a plurality of interface modules 540 for accessing work orders and process data from a legacy storage system (which may or may not be housed within the aircraft facility 510), reformatting the work orders, and presenting the reformatted work orders to inspectors, mechanics, planners, engineers, machinists, auditors and anyone else involved in carrying out these tasks.

For example, a mechanic needs Product Definition Data (PDD) to understand and accomplish assigned work for aircraft assembly and installation. The mechanic logs onto the interface module 540, and requests an Installation Plan (a type of work order) for this PDD. The interface module 540 retrieves the installation plan, reformats it, and displays it with a hyperlink to the PDD. The mechanic then clicks the hyperlink, whereby the interface module displays the PDD.

Each interface module 540 provides a single portal for accessing all information needed to perform a task during production, inspection or maintenance. The highlighted words help to ensure safety compliance. The hyperlinks enable quick and easy navigation among files.

A system herein also reduces system operating time and thus reduces production time. The interface module provides a less expensive alternative to scrapping or modifying a legacy storage system.

An interface module herein may perform functions in addition to reformatting work orders and presenting reformatted work orders. Consider the example of a quality inspector who uses an interface module herein to inspect an assembly. During inspection, a non-conformance is identified. The interface module can also generate non-conformance text.

An interface module herein is not limited to work orders on aircraft. It may be applied to any environment involving instructions on how to perform specific production tasks.

The invention claimed is:

1. A data system comprising:
   a legacy system for storing work orders and process data; and
   a computer-based interface module for retrieving the work orders from the legacy system; reformatting the retrieved work orders to highlight words corresponding to process compliance and insert hyperlinks to process data referenced by the work orders; and presenting the reformatted work orders with the highlighted words and the hyperlinks.

2. The data system of claim 1, wherein the interface module highlights words to increase noticeability of the words to ensure at least one of production conformance and safety compliance.

3. The data system of claim 2, wherein the interface module highlights words including cautions, notes and requirements.

4. The system of claim 1, wherein the interface module retrieves, formats, and presents in real time.

5. The system of claim 1, wherein the interface module reformats the work orders without modifying the work orders and process data stored in the legacy system.

6. The system of claim 1, wherein the interface module prompts a user to identify a work order, retrieves the identified work order from the legacy system, and reformats the retrieved work order.

7. The system of claim 1, wherein the legacy system does not provide a windows-based graphical user interface (GUI), and wherein the interface module provides a windows-based/web-based GUI to identify work orders for retrieval and to display the reformatted work orders.

8. The system of claim 1, wherein the interface module informs the legacy system as to when a work order has been completed.

9. The system of claim 1, wherein the interface module parses text in the retrieved work orders, and compares the parsed text to a list of words and codes to identify words to be highlighted and hyperlinked in the reformatted work orders.

10. The system of claim 1, wherein the work orders include aircraft installation plans, and wherein the interface module searches the retrieved installation plans for words identifying drawings, specifications and standards, canned notes, certification requirements, and business policies, procedures and processes.

11. An aircraft facility comprising aircraft tooling and the data system of claim 1.

12. A method of using work orders and process data stored in a legacy storage system, the method comprising using a computer to retrieve the work orders from the legacy system; reformat the retrieved work orders to highlight words corresponding to process compliance and insert hyperlinks to process data referenced by the work orders; and present the reformatted work orders with the highlighted words and the hyperlinks.

13. The method of claim 12, wherein the reformatted work orders are used to perform tasks in a commercial aircraft factory or depot.

14. The method of claim 13, wherein the reformatted work orders are used to operate tooling in the factory or depot.

15. The method of claim 12, wherein the computer highlights words to ensure at least one of production conformance and safety compliance with respect to a commercial aircraft.

16. An article comprising computer memory encoded with non-transitory data for instructing a processor to retrieve work orders from a legacy database system; reformat the retrieved work orders to highlight words corresponding to process compliance and insert hyperlinks to process data stored in the legacy system and referenced by the work orders; and present the reformatted work orders with the highlighted words and the hyperlinks.

17. The article of claim 16, wherein the data includes a parse engine for parsing text in the retrieved work orders, and a reformat engine for comparing the parsed text to a list of key words and codes to identify words to be highlighted and hyperlinked in the reformatted work orders.

18. The article of claim 17, wherein the data further includes an interface engine for retrieving the identified work order from the legacy system; and a presentation engine for presenting the reformatted work order.

19. The article of claim 17, wherein the reformat engine highlights words to ensure at least one of production conformance and safety compliance.

20. The article of claim 16, wherein the data causes the computer to retrieve a work order, reformat the retrieved work order, and present the reformatted work order in real time.

* * * * *